United States Patent [19]

Spiger

[11] Patent Number: 4,620,230
[45] Date of Patent: Oct. 28, 1986

[54] DISPLAY SYSTEM

[75] Inventor: Robert J. Spiger, Bothell, Wash.

[73] Assignee: The Boeing Company, Seattle, Wash.

[21] Appl. No.: 653,582

[22] Filed: Sep. 24, 1984

[51] Int. Cl.$^4$ .......................... G02F 1/33; H04N 5/66; H04N 5/74
[52] U.S. Cl. .................................... 358/201; 350/358; 358/235
[58] Field of Search ............... 358/199, 201, 241, 230, 358/235, 231, 285; 350/358

[56] References Cited

U.S. PATENT DOCUMENTS

| | | | |
|---|---|---|---|
| 1,670,757 | 5/1928 | von Bronk | 358/199 |
| 2,289,363 | 7/1942 | Howells | 358/199 |
| 2,509,545 | 5/1950 | Walton | 358/235 |
| 2,670,665 | 3/1954 | Caldwell | 358/293 |
| 2,946,253 | 7/1960 | Clark, Jr. | 350/96.1 |
| 3,055,258 | 9/1962 | Hurvitz | 340/783 |
| 3,279,341 | 10/1966 | Arkell et al. | 340/763 |
| 3,322,032 | 5/1967 | Leach | 350/612 |
| 3,459,466 | 8/1969 | Giordmaine | 350/356 |
| 3,493,759 | 2/1970 | Adler | 358/201 |
| 3,508,808 | 4/1970 | Schmidt | 350/382 |
| 3,517,386 | 6/1970 | Jones | 350/96.24 |
| 3,544,200 | 12/1970 | Boll | 350/486 |
| 3,627,405 | 12/1971 | Feldman et al. | 350/358 |
| 3,655,986 | 4/1972 | Lax | 358/241 |
| 3,992,682 | 11/1976 | White et al. | 358/201 |
| 4,085,322 | 4/1978 | Sick | 350/616 |
| 4,107,701 | 8/1978 | Sprague et al. | 358/201 |
| 4,307,929 | 12/1981 | Eveleth | 358/201 |

FOREIGN PATENT DOCUMENTS 368069 3/1932 United Kingdom .

Primary Examiner—Howard W. Britton
Attorney, Agent, or Firm—Christensen, O'Connor, Johnson & Kindness

[57] ABSTRACT

A laser scanned, flat panel display system is disclosed. In one embodiment, the display system comprises a display panel (54), a plurality of first mirrors (30), a plurality of second mirrors (50), a source of light (10), means for modulating the intensity of the light (12), and deflection means (14). The display panel includes a display surface that extends along X and Y axes. Each first mirror is located at a different position along the X axis, and has an elongated dimension normal to the X axis. Each second mirror is located at a different position along the Y axis, and includes an elongated dimension normal to the Y axis. The deflection means directs the light as a first beam (17) to a selected first reflection point (32) on one of the first mirrors, such that the first beam is reflected from the first reflection point as a second beam (18). The second beam strikes one of the second mirrors at a second reflection point (52) and is reflected as a third beam (19) to a display point (53) on the display surface. The first and second mirrors are positioned such that varying the location of the first reflection point along the elongated dimension of a particular first mirror causes the Y coordinate of the display point to change, and varying the location of the first reflection point from one first mirror to another first mirror causes the X coordinate of the display point to change.

14 Claims, 8 Drawing Figures

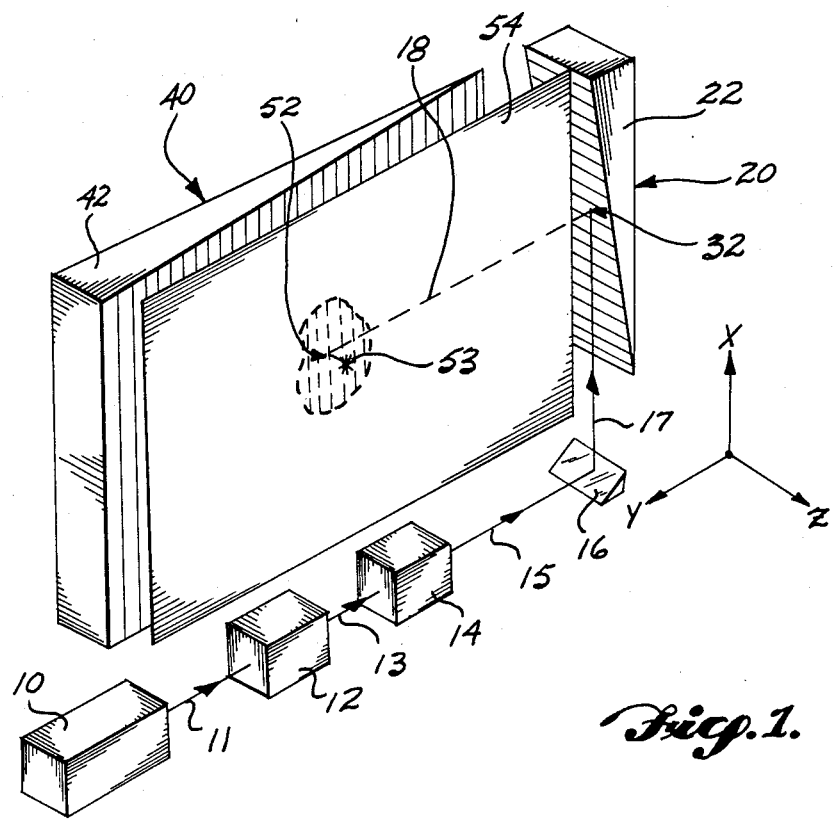
Fig. 1.
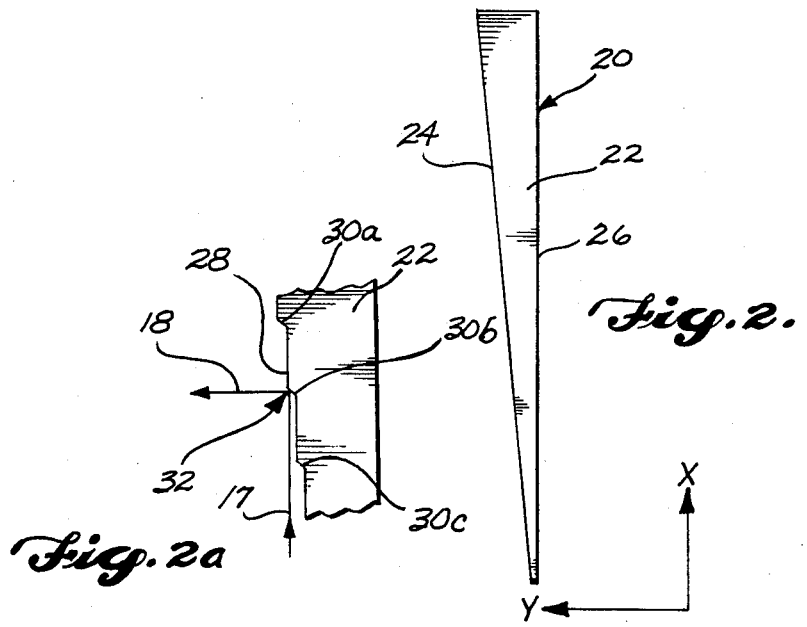
Fig. 2.
Fig. 2a.

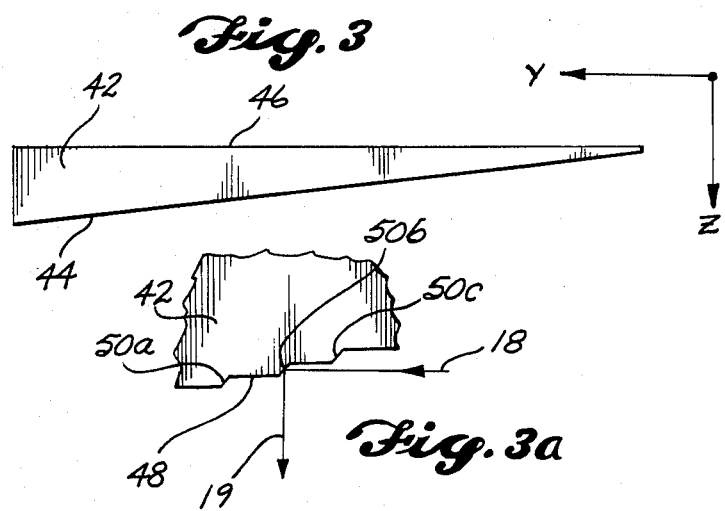
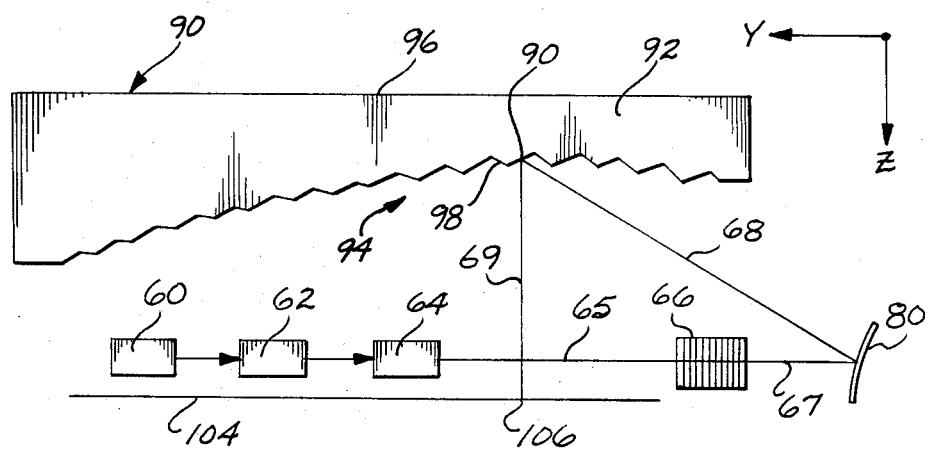

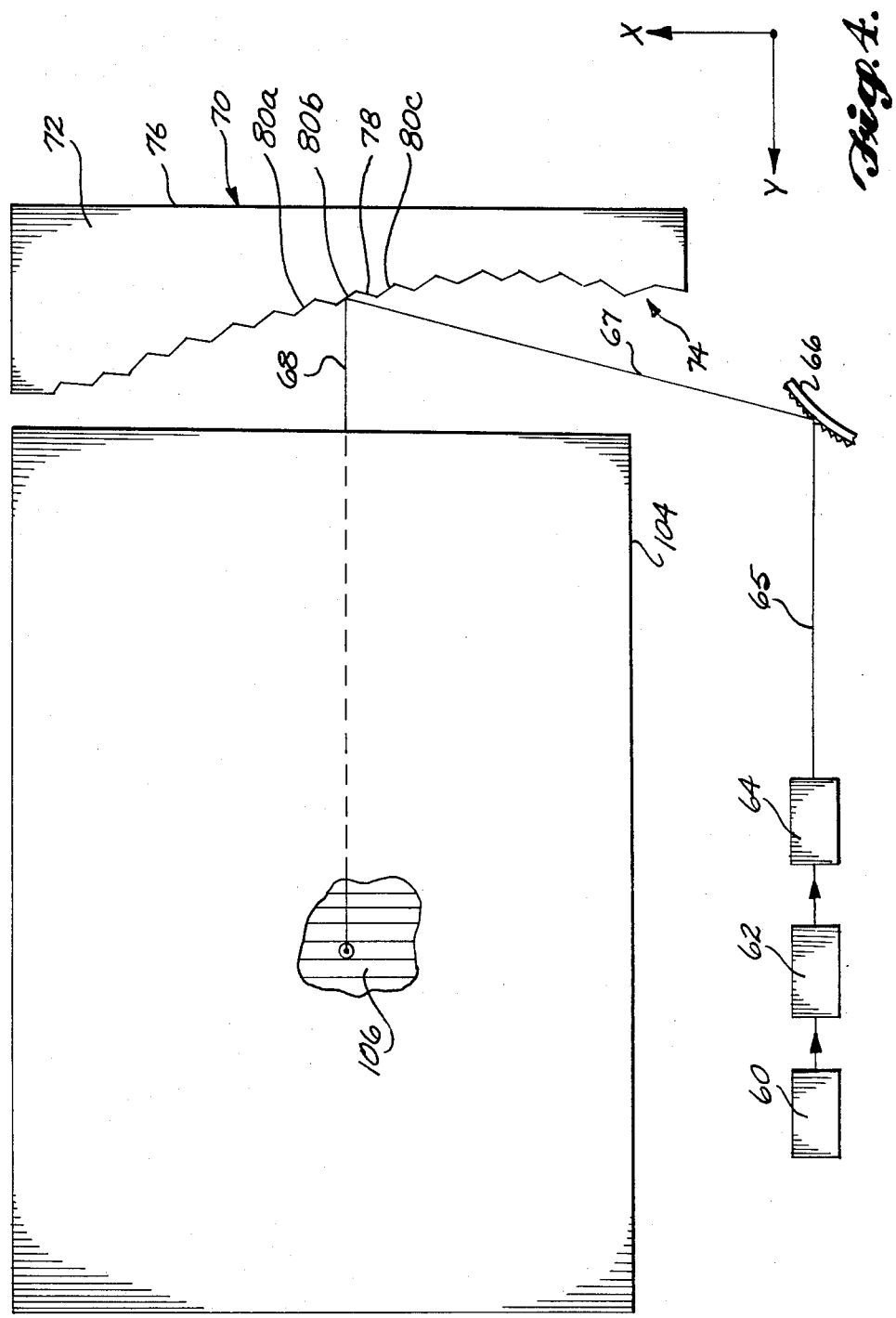

DISPLAY SYSTEM

FIELD OF THE INVENTION

The present invention relates to flat panel display systems.

BACKGROUND OF THE INVENTION

Currently available display systems include cathode ray tubes and a variety of flat panel displays such as LED arrays, liquid crystal arrays, thin film electroluminescent displays, and gas discharge displays. The flat panel display systems incorporate an X-Y grid of contacts to address and drive the individual display pixels.

Cathode ray tubes are bulky, relatively heavy, and susceptible to image distortion caused by magnetic field variations. For large area displays, the bulk and weight of cathode ray tubes increases rapidly, resulting in the use of projection systems for most large television systems. For flat panel displays, the large number of drivers and addressing lines becomes a limitation for large display sizes. As a result of these limitations, there is a need for a display system that combines the low volumes of flat panel displays with the relatively simple scanning techniques of cathode ray tubes.

Several efforts have been under way to provide such an enhanced system that would be particularly suitable for large displays. One approach has been the reformatting of the cathode ray tube envelope and electron gun geometry. This approach is a variation of the standard cathode ray tube electromagnetic or electrostatic deflection scheme, and seeks to direct the electron beam or beams within the confines of a less bulky vacuum envelope. The need to direct the electron beam within the vacuum envelope, however, requires that the envelope be sufficiently massive or contain sufficient internal supports to withstand the high force generated by atmospheric pressure over large areas. A second approach has been a reduction in the number of drivers required in a flat panel display system. This approach eliminates the need for a scanned beam, but may still require internal supports, particulary for the gas discharge displays and liquid crystal displays.

SUMMARY OF THE INVENTION

The present invention provides a laser scanned flat panel display system that uses an optical scanning technique that permits the laser beam to be folded to fit within a flat panel, low volume configuration.

In one preferred embodiment, the display system of the present invention comprises a display panel, a plurality of first mirrors, a plurality of second mirrors, a source of light, means for modulating the intensity of the light, and deflection means. The display panel includes a display surface that extends along X and Y axes. Each first mirror is located at a different position along the X-axis, and has an elongated dimension normal to the X-axis. Each second mirror is located at a different position along the Y-axis, and includes an elongated dimension normal to the Y-axis. The deflection means directs the light as a first beam to a selected first point on one of the first mirrors, such that the first beam is reflected from the first reflection point as a second beam. The second beam strikes one of the second mirrors at a second reflection point, and is reflected as a third beam to a display point on the display surface. The first and second mirrors are positioned such that varying the location of the first reflection point along the elongated dimension of a particular first mirror causes the Y coordinate of the display point to change, and varying the location of the first reflection point from one first mirror to another first mirror causes the X coordinate of the display point to change.

In a further aspect of the invention, the first and second mirrors are positioned such that varying the location of the first reflection point along the elongated dimension of a particular first mirror causes the second beam to strike different second mirrors, and such that varying the location of the first reflection point from one first mirror to another first mirror causes the second reflection point to move along the elongated dimension of a particular second mirror.

BRIEF DESCRIPTION OF THE DRAWINGS

FIG. 1 is an isometric view of a preferred embodiment of the display system of the present invention.

FIG. 2 is a front elevational view of the first mirror assembly of the display system of FIG. 1.

FIG. 2a is an enlarged view of a portion of FIG. 2.

FIG. 3 is a top plan view of the second mirror assembly of the display system of FIG. 1.

FIG. 3a is an expanded view of a portion of FIG. 3.

FIG. 4 is a front, elevational view of a second preferred embodiment of the display system of the present invention.

FIG. 5 is a top plan view of the display system of FIG. 4.

DETAILED DESCRIPTION OF THE INVENTION

Figure 6:
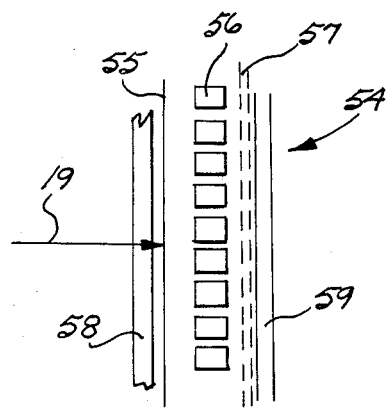
FIG. 6 is a schematic, cross-sectional view of a display panel for use in the present invention.

Referring initially to FIG. 1, a preferred embodiment of the present invention is shown comprising laser 10, modulator 12, deflection unit 14, deflection mirror 16, first mirror assembly 20, second mirror assembly 40, and display panel 54. Laser 10 produces light beam 11 that is modulated in intensity by modulator 12 to produce modulated beam 13. Modulated beam 13 is input into deflection unit 14, and the deflection unit produces small deflections in the modulated beam in two independent directions normal to the modulated beam to produce output beam 15. The light of output beam 15 is then reflected by deflection mirror 16, first mirror assembly 20 and second mirror assembly 40 to point 53 on display panel 54. The laser light striking the display panel at point 53 causes illumination at that point, the intensity of the illumination corresponding to the intensity of modulated beam 13. Modulator 12 therefore controls the intensity of illumination at point 53. As described below, the position of point 53 on the display panel is controlled by deflection unit 14.

The entire display system of FIG. 1 can be contained within a volume having a comparatively small extent in the direction normal to display panel 54. For ease of discussion, display panel 54 will be assumed to lie in the X-Y plane (FIG. 1), with the X-axis coinciding with the elongated dimension of first mirror assembly 20, and the Y-axis coinciding with the elongated dimension of second mirror assembly 40. The Z-axis is normal to the display panel, and the edges of the display panel are aligned with the X and Y axes. The positive directions along the X, Y and Z axes are indicated by arrows in FIG. 1.

In one preferred embodiment, the display system of FIG. 1 is provided with signals identical to those used in a black and white raster scanned display such as a television receiver. In particular, modulator 12 is controlled by a conventional video intensity signal, and deflection unit 14 is controlled by conventional horizontal and vertical scanning signals. Deflection unit 14 is oriented such that the horizontal scanning signal causes deflection along the Z-axis, with the slowly changing (scanning) portion of the horizontal deflection signal causing output beam 15 to change its deflection in the negative Z direction, and the rapid return portion of the horizontal deflection signal causing output beam 15 to change its deflection in the positive Z direction. The deflection unit is also oriented such that the vertical deflection signal causes deflection along the X-axis, with the slowly changing (scanning) portion of the vertical deflection signal causing output beam 15 to change its deflection in the positive X direction, and the rapid return portion of the vertical deflection signal causing output beam 15 to change its deflection in the negative X direction. As described below, the result of deflecting the laser beam in such a manner will be that point 53 will be scanned across and down display panel 54 in a manner identical to the scanning of a conventional CRT display.

Laser 10 may comprise any suitable commercially available laser. The width and divergence of the laser beam should be selected based upon the desired size for point 53 on display panel 54, i.e., on the required resolution of the display system. In general, a laser that produces a beam having a divergence less than or equal to one milliradian is preferred. The power of laser 10 should be selected based upon the required brightness of the display, and upon the type of display panel, as described below. Different types of lasers may be selected to produce displays of different colors.

Modulator 12 may be any well-known type of electro-optic or acousto-optic device having a suitable bandwidth. Deflection unit 14 is preferably a two-axis, acousto-optic deflector that has sufficient resolution to produce a 400–500 line display on display panel 54.

Deflection mirror 16 is preferably a front surfaced mirror having a planar, spherical or cylindrical reflecting surface that may either be smooth or stepped as described below. The function of deflection mirror 16 is to reflect output beam 15 to beam 17 traveling toward first mirror assembly 20. The deflection mirror thereby permits a more compact arrangement of the components of the display system. In the embodiment shown in FIG. 1, deflection mirror 16 is a smooth surfaced planar mirror positioned directly below the first mirror assembly and oriented at an angle of 45° with respect to the undeflected output beam 15.

First mirror assembly 20 comprises a body 22 that is wedge shaped in cross section, and that has a comparatively long dimension along the X-axis and a comparatively short dimension along the Y-axis. Referring now to FIGS. 2 and 2a, body 22 includes rear surface 26 aligned with the X-axis, and front surface 24 slightly inclined with respect to the X-axis. Front surface 24 is formed into a series of steps comprising mirrors 30a, 30b and 30c and spacing surfaces 28. Each mirror 30 is generally rectangular in shape, and is elongated across the width of the first mirror assembly in the Z direction. Mirrors 30 are inclined at an angle of approximately 45° with respect to the X-axis, such that when beam 17 strikes first reflection point 32 on one of such mirrors, it is reflected to the left normal to the X-axis as beam 18, as shown in FIG. 2a. The short dimension of each mirror is preferably on the order of the diameter of beam 17. Each spacing surface 28 is oriented substantially parallel to the X-axis, such that beam 17 cannot strike the spacing surfaces.

The function of first mirror assembly 20 is to determine the vertical position of point 53, i.e., the position of point 53 along the X-axis. Referring to FIG. 2a, beam 17 from deflection mirror 16 is shown striking first reflection point 32 on mirror 30b and being reflected to the left as beam 18. It is evident from FIG. 2a that if beam 17 were to be deflected a small distance either to the left or to the right, then the first reflection point would be on mirror 30a or mirror 30c respectively, and as a result the vertical position of beam 18 would be modified. As described below, second mirror assembly 40 does not modify the vertical position of the laser beam, and the vertical position of beam 18 therefore specifies the vertical position of point 53. thus by modifying the position of beam 17 in the Y direction, the height of point 53 can be controlled. The position of beam 17 in the Y direction can be controlled by deflection unit 14 by varying the orientation of output beam 15 in the X direction. The vertical deflection signal applied to deflection unit 14 therefore controls the vertical position of point 53. As illustrated in FIG. 2a, the projections of spacing surfaces 28 onto the X-Y plane have a considerably greater extent than do the projection of mirrors 30. As a result, a comparatively small deflection of beam 17 along the Y direction (and of output beam 15 in the X direction) results in a comparatively large change in the height of point 53.

Referring now to FIGS. 1, 3 and 3a, second mirror assembly 40 comprises body 42 that is wedge shaped in cross section, and that has a comparatively long dimension along the Y-axis and a comparatively short dimension along the Z-axis. The cross section of body 42 is constant along the X-axis, and body 42 is coextensive with first mirror assembly 20 in the X direction. Body 42 includes rear surface 46 aligned with the Y-axis and front surface 44 slightly inclined with respect to the Y-axis. Front surface 44 is formed into a series of steps comprising mirrors 50a, 50b and 50c and spacing surfaces 48. Each mirror 50 is generally rectangular in shape, and is elongated across the width of the second mirror assembly in the X direction. Mirrors 50 are inclined at an angle of approximately 45° with respect to the Y-axis, such that when beam 18 strikes a second reflection point 52 on one of mirrors 50, it is reflected in the forward (Z) direction as beam 19 towards display panel 54. The short dimension of each mirror is preferably on the order of the diameter of beam 18. Each spacing surface 48 is oriented substantially parallel to the Y-axis, such that beam 18 cannot strike the spacing surfaces.

The function of second mirror assembly 40 is to control the horizontal position of point 53, i.e., the position of point 53 along the Y-axis. Referring to FIG. 3a, beam 18 from first mirror assembly 20 is shown striking second reflection point 52 on mirror 50b and being reflected forward as beam 19. It is evident from FIG. 3a that if beam 18 were to be deflected a small distance either forward or rearward in the Z direction, then the second reflection point would be on mirror 50a or mirror 50c respectively, and as a result the horizontal position of beam 19 and of point 53 would be modified. Since neither deflection mirror 16 nor first mirror assembly 20 changes the orientation of the laser beam in the Z direction, the horizontal position of point 53 is controlled by the amount of deflection of output beam 15 along the Z-axis. The horizontal deflection signal applied to deflection unit 14 therefore controls the horizontal position of point 53. As illustrated in FIG. 3a, the projections of spacing surfaces 48 onto the Y-Z plane have a considerably greater extent than do the projections of mirrors 50. As a result, a comparatively small deflection of beam 18 along the Z direction results in a comparatively large change in the horizontal position of point 53.

In summary, movement of point 53 from left to right across display panel 54 results when deflection unit 14 causes output beam 15 to move in the negative Z direction. Such motion of output beam 15 causes beam 17 to move in the same direction, causing first reflection point 32 to move in the negative Z direction along the length of a given first mirror. As a result, beam 18 moves in the negative Z direction, and second reflection point 52 moves in the negative Y direction, such that the second reflection point is successively located on different second mirrors. Each second mirror reflects the light in the Z direction towards display panel 54, and movement of second reflection point 52 from left to right therefore causes point 53 to move from left to right across the display panel. Vertical scanning of point 53 results when deflection unit 14 causes output beam 15 to be deflected in the positive X direction. Such deflection of output beam 15 causes beam 17 to increase its deflection in the negative Y direction, causing first reflection point 32 to move down the length of first mirror assembly 20, successively striking different first mirrors. Each first mirror causes beam 18 to be produced traveling towards the second mirror assembly in the Y direction. The second mirror assembly does not change the X position of the light beam, and the X position of point 53 is therefore the same as the X position of first reflection point 32. Motion of first reflection point 32 down the length of first mirror assembly 20 therefore causes point 53 to move down the display panel.

Display panel 54 may comprise a ground glass plate upon which beam 19 is incident to produce a visible spot of light having a color determined by the color of beam 11 produced by laser 10. A color display on display panel 54 can be created using a superposition of laser beams at different wavelengths (e.g., red, green and blue) to create the desired colors. For comparatively large displays, or for displays intended for use in a high ambient light environment, display panel 54 can be coated with an appropriate phosphor adapted to be excited by the laser beam. In the case of a phosphor coated panel, a color display could be achieved through the use of multiple color phosphors on the display panel. A third embodiment for display panel 54 is illustrated in FIG. 6. In this embodiment, the display panel is enclosed between transparent rear plate 58 and transparent front plate 59. The display panel of FIG. 6 further includes photocathode 55, channel electron multiplier 56 and phosphor layer 57. Beam 19 causes the emission of photoelectrons from photocathode 55. The electrons are then multiplied in channel electron multiplier 56 and accelerated by an electrostatic potential to excite phosphor layer 57. The display panel of FIG. 6 can be used in connection with a lower power base, because of the amplification provided by the electrostatic potential power supply. Operation of the electron multiplier layer generally requires a sealed, evacuated area between rear plate 58 and front plate 59. However, the proper construction can allow the electron multiplier to operate at atmospheric pressure.

FIGS. 4 and 5 illustrate a second embodiment of the present invention in which the mirrors are positioned and oriented in a nonrectilinear fashion. Referring initially to FIG. 4, the second embodiment comprises laser 60, modulator 62 and deflection unit 64 that are fully analogous to the corresponding components of the FIG. 1 embodiment. The embodiment of FIG. 4 also includes deflection mirror 66, first mirror assembly 70, second mirror assembly 90 (FIG. 5), and display panel 104. As in the embodiment of FIG. 1, deflection unit 64 produces output beam 65 that can be independently deflected along the X and Z axes. Output beam 65 is reflected by deflection mirror 66, first mirror assembly 70 and second mirror assembly 90 to point 106 on display panel 104.

Deflection mirror 64 includes a stepped spherical reflecting surface that is convex in the direction facing output beam 65. Mirror 66 therefore causes output beam 65 to be reflected towards first mirror assembly 70 as beam 67. The convex, spherical shape of mirror 66 causes a given angular deflection of output beam 65 to be amplified into a larger angular deflection of beam 67, with the degree of amplification being controlled by the radius of curvature of mirror 66. The steps on the reflecting surface of mirror 66 extend substantially in the Z direction and correspond in number to the number of horizontal scanning lines used in the display system. In particular, each step of mirror 66 is positioned to intercept output beam 65 during one complete horizontal scanning line.

First mirror assembly 70, shown in cross section in FIG. 4, comprises a body 72 that is generally wedge shaped in cross section, and that has a comparatively long dimension along the X-axis and a comparatively short dimension along the Y-axis. body 72 includes rear surface 76 aligned with the X-axis, and front surface 74 that is variably inclined with respect to the X-axis. Front surface 74 is formed into a series of steps comprising spacing surfaces 78 and mirrors 80. The sizes of mirrors 80 and spacing surfaces 78 have been exaggerated in FIGS. 4 and 5 for purposes of illustration. Each mirror 80 is generally rectangular in shape, and has an elongated dimension that extends in the Z and Y directions and that is slightly convex, as indicated schematically in FIG. 5. Each mirror 80 is positioned and inclined such that when it intercepts beam 67 emerging from mirror 66, it will cause beam 67 to be reflected as beam 68 traveling in the Y and Z directions towards second mirror assembly 90. Each spacing surface 78 is oriented such that it is parallel to beam 67 when beam 67 strikes an adjacent mirror 80, and beam 67 therefore cannot strike the spacing surfaces.

Each mirror 80 is associated on a one-to-one basis with a single step of mirror 66. For each horizontal scanning line of the display system, deflection unit 64 deflects output beam 65 in the X direction such that the output beam strikes a particular step of mirror 66 associated with that horizontal line. The resulting reflected beam 67 then proceeds to strike a particular mirror 80 that is also associated with that horizontal scanning line.

Referring now to FIG. 5, second mirror assembly 90 comprises a body 92 that is generally wedge shaped in cross section, and that has a comparatively long dimension along the Y-axis and a comparatively short dimension along the Z-axis. The second mirror assembly is coextensive with the display panel in the X direction. Body 92 includes rear surface 96 aligned with the Y-axis, and front surface 94 that is variably inclined with respect to the Y-axis. Front surface 94 is formed into a series of steps comprising mirrors 90 and spacing surfaces 98. Each mirror 90 is generally rectangular in shape, and is elongated across the width of the second mirror assembly in the X direction. Each mirror 90 is positioned and inclined such that when it intercepts beam 68 reflected from first mirror assembly 70, it will cause beam 68 to be reflected as beam 69 traveling in the Z direction toward display panel 104. Each spacing surface 98 is oriented such that it is parallel to beam 68 when beam 68 strikes an adjacent mirror 90, and beam 68 therefore cannot strike the spacing surfaces.

While the preferred embodiments of the invention have been illustrated and described, it should be understood that variations will be apparent to those skilled in the art. Accordingly, the invention is not to be limited to the specific embodiments illustrated and described, and the true scope of and spirit of the invention should be determined by reference to the following claims.

The embodiments of the invention in which an exclusive property or privilege is claimed are defined as follows:

1. A display system comprising:
   a display panel including a display surface extending along X and Y axes;
   a plurality of first mirrors located at different positions along the X axis, each first mirror having an elongated dimension oriented normal to the X axis;
   a plurality of second mirrors located at different positions along the Y axis, each second mirror having an elongated dimension oriented normal to the Y axis;
   a source of light;
   means for modulating the intensity of the light;
   deflection means for directing the light as a first beam to a selected first reflection point on one of the first mirrors such that the first beam is reflected from the first reflection point as a second beam, the second beam strikes one of the second mirrors at a second reflection point and is reflected as a third beam, and the third beam strikes the display surface at a display point;
   the first and second mirrors being positioned such that varying the location of the first reflection point along the elongated dimension of a particular first mirror causes the Y coordinate of the display point to change, and varying the location of the first reflection point from one first mirror to another first mirror causes the X coordinate of the display point to change.

2. The display system of claim 1, wherein the first and second mirrors are positioned such that varying the location of the first reflection point along the elongated dimension of a particular first mirror causes the second beam to strike different second mirrors.

3. The display system of claim 2, wherein the first and second mirrors are positioned such that varying the location of the first reflection point from one first mirror to another first mirror causes the second reflection point to move along the elongated dimension of a particular second mirror.

4. The display system of claim 3, wherein the display panel is substantially rectangular in shape, a first edge of the display panel extending along the X axis, and a second edge of the display panel extending along the Y axis.

5. The display system of claim 4, wherein the first mirrors are located adjacent the first edge of the display panel.

6. The display panel of claim 5, wherein the elongated dimensions of the first mirrors are substantially parallel to one another.

7. The display system of claim 5, wherein each first mirror is positioned so as to cause the second beam to be oriented normal to the X axis.

8. The display system of claim 4, wherein each second mirror is located adjacent one side of the display panel and is approximately coextensive with the display panel along the X axis.

9. The display system of claim 8, wherein the elongated dimensions of the second mirrors are parallel to one another.

10. The display system of claim 8, wherein the first mirrors are located adjacent the first edge of the display panel and are positioned so as to cause the second beam to be oriented normal to the X axis, and wherein each second mirror is positioned so as to cause the third beam to be oriented normal to the X and Y axes.

11. The display system of claim 4, wherein the display panel is planar, and wherein the X and Y axis are orthogonal to one another.

12. The display system of claim 11, wherein each first mirror and each second mirror is generally rectangular and has a dimension normal to its elongated dimension on the order of the beam diameter.

13. The display system of claim 12, wherein the elongated dimension of each first mirror extends along the Z axis.

14. The display system of claim 13, wherein the elongated dimension of each second mirror extends along the X axis.

* * * * *